United States Patent

Vega et al.

[11] Patent Number: 6,147,605
[45] Date of Patent: Nov. 14, 2000

[54] METHOD AND APPARATUS FOR AN OPTIMIZED CIRCUIT FOR AN ELECTROSTATIC RADIO FREQUENCY IDENTIFICATION TAG

[75] Inventors: Victor Allen Vega, Hercules; John H. Rolin, San Jose; Noel H. Eberhardt, Cupertino, all of Calif.

[73] Assignee: Motorola, Inc., Schaumburg, Ill.

[21] Appl. No.: 09/151,568

[22] Filed: Sep. 11, 1998

[51] Int. Cl.[7] ................................................ G08B 13/14
[52] U.S. Cl. ...................................... 340/572.7; 257/679
[58] Field of Search ........................ 340/572.7, 572.1, 340/825.54, 825.34, 10.1; 342/44, 51; 257/679

[56] References Cited

U.S. PATENT DOCUMENTS

| | | | |
|---|---|---|---|
| 5,099,227 | 3/1992 | Geiszler et al. | 340/572.5 |
| 5,175,418 | 12/1992 | Tanaka | 235/439 |
| 5,430,441 | 7/1995 | Bickley et al. | 340/825.54 |
| 5,528,222 | 6/1996 | Moskowitz et al. | 340/572.7 |
| 5,566,441 | 10/1996 | Marsh et al. | 29/600 |
| 5,682,143 | 10/1997 | Brady et al. | 340/572.7 |
| 5,705,852 | 1/1998 | Orihara et al. | 257/679 |
| 5,710,458 | 1/1998 | Iwasaki | 340/572.7 X |
| 5,847,447 | 12/1998 | Rozin et al. | 257/678 |

FOREIGN PATENT DOCUMENTS

| | | |
|---|---|---|
| 0324564B1 | 7/1995 | European Pat. Off. . |
| 0435137B1 | 7/1999 | European Pat. Off. . |

*Primary Examiner*—Thomas Mullen
*Attorney, Agent, or Firm*—Terri S. Hughes; Val Jean F. Hillman

[57] ABSTRACT

A radio frequency identification tag (100) in accordance with the present invention includes a first antenna element (112), a second antenna element (114) and a radio frequency identification circuit (116). The first antenna element (112) is electrically isolated from the second antenna element (114). The radio frequency identification circuit has a first pad (230) and a second pad (232). The first and second pads of the radio frequency identification circuit are coupled, respectively, to the first and second antenna elements. The radio frequency identification circuit includes a load modulation circuit (222) coupled to at least one of the first or second pads to produce a load modulated signal on at least one of the first or second pads that varies from a first amplitude to a second amplitude. The load modulation circuit has a modulation impedance and a predetermined voltage threshold that an input signal must exceed before the modulated signal is produced. The first and second pads of the integrated circuit have an input capacitance as measured between them. The modulation impedance, voltage threshold, and pad capacitance are optimized for electrostatic radio frequency identification applications. Alternatively, a modulation circuit is not coupled to the first and second antenna elements and is instead coupled through a third pad with a third electrostatic antenna element for data transmission. Also, electronic article surveillance (EAS) is alternatively provided with the radio frequency identification circuit and is alternatively, selectively defeated.

70 Claims, 13 Drawing Sheets

METHOD AND APPARATUS FOR AN OPTIMIZED CIRCUIT FOR AN ELECTROSTATIC RADIO FREQUENCY IDENTIFICATION TAG

FIELD OF THE INVENTION

The invention relates generally to radio frequency identification tags, and in particular, to a circuit and method for optimizing electrostatic radio frequency identification tags.

BACKGROUND OF THE INVENTION

Remotely powered electronic devices and related systems are known. For example, U.S. Pat. No. 5,099,227 issued to Geiszler et al. entitled Proximity Detecting Apparatus, discloses a remotely powered device which uses electromagnetic coupling to derive power from a remote source and then uses both electromagnetic and electrostatic coupling to transmit stored data to a receiver often collocated with the remote source. Such remotely powered communication devices are commonly known as radio frequency identification ("RFID") tags.

Radio frequency identification tags and associated systems have numerous uses. For example, radio frequency identification tags are frequently used for personal identification in automated gate sentry applications protecting secured buildings or areas. These tags often take the form of access control cards. Information stored on the radio frequency identification tag identifies the person seeking access to the secured building or area. Older automated gate sentry applications require the person accessing the building to insert or swipe their identification tag or card into or through a reader for the system to read the information from the identification tag. Newer radio frequency identification tag systems allow the radio frequency identification tag to be read at a small distance using radio frequency data transmission technology, thereby eliminating the need to insert or swipe an identification tag into or through a reader. Most typically, the user simply holds or places the radio frequency identification tag near a base station, which is coupled to a security system securing the building or area. The base station transmits an excitation signal to the radio frequency identification tag that powers circuitry contained on the radio frequency identification tag. The circuitry, in response to the excitation signal, communicates stored information from the radio frequency tag to the base station, which receives and decodes the information. The information read is used by the security system to determine if access is appropriate. Also, radio frequency identification tags are written remotely by an excitation signal appropriately modulated in a predetermined manner.

In addition to typical applications for access control of persons, RFID tags are useful in applications identifying things, such as electronic animal identification, baggage tracking, parcel tracking, inventory management applications, asset identification and tracking, and other applications. These applications involve transmitting stored information from a tag to an exciter/reader system in close proximity with the tag. These applications may also involve transmitting information from the exciter to the tag for storage on the tag.

Earlier RFID tags and systems primarily use electromagnetic coupling to remotely power the remote device and couple the remote device with an exciter system and a receiver system. The exciter generates an electromagnetic excitation signal to power up the device and the receiver receives the signal produced by the remote device.

Earlier electromagnetic coupling mechanisms include an oscillator as part of the exciter circuitry and a coil antenna on both the exciter circuitry and the remote tag that includes an electronic circuit. For example, in an earlier system, excitation circuitry is connected to a coil antenna, which radiates excitation signals that are picked up by a coil antenna mounted on a tag that also contains the electronic circuit. The excitation signals energize the circuit, which then provides an information-carrying signal that is transmitted to the receiver using electromagnetic or electrostatic coupling.

One problem with the use of electromagnetic coupling between a remote device and either an exciter or a receiver has been the complexity involved in the manufacture of remote devices that employ a coil antenna. The spiral layout of a typical coil antenna makes it more difficult to produce, increases cost and also the size of the remote device. Also, the coil antennas require tight tolerances for efficient performance.

Electrostatic coupling for RFID tags has been proposed to address the problems and cost associated with electromagnetic coupling. For electrostatically coupled RFID tags, the antenna coil or antenna coil and capacitor external to the electronic circuit are eliminated and replaced with cheaper electrostatic antennas which may be as simple as conductive ink printed on paper. The virtues of electrostatically coupled RFID tags are discussed in commonly assigned pending U.S. patent application Ser. No. 08/540,813, filed Oct. 11, 1995 by Ted Geiszler et al., titled "Remotely Powered Electronic Tag and Associated Exciter/Reader and Related Method", now abandoned; U.S. patent application Ser. No. 09/031,848 filed Feb. 27, 1998 by Victor Allen Vega et al., titled "Radio Frequency Identification Tag System Using Tags Arranged For Coupling to Ground"; U.S. patent application Ser. No. 09/041,480, filed Mar. 12, 1998 by Victor Allen Vega et al., titled "Radio Frequency Identification Tag Arranged For Magnetically Storing Tag State Information", now U.S. Pat. No. 6,040,773; and U.S. patent application Ser. No. 09/045,357, filed Mar. 20, 1998 by Victor Allen Vega et al., titled "Radio Frequency Identification Tag With a Programmable Circuit State," the disclosures of which applications are hereby incorporated by reference.

Electrostatic RFID tags typically use the same functional circuit blocks that are adapted for use with electromagnetic RFID tags. However, the characteristics of electrostatic coupling require different circuit considerations from Electromagnetic coupling. One characteristic of electrostatic coupling that is different from electromagnetic coupling is the nature of the electrostatic and electromagnetic fields, and in particular, the roll-off in coupling voltage associated with the fields. This characteristic affects read ranges. Also, the impedance characteristics for electrostatic coupling are different from the impedance characteristics for electromagnetic coupling. Although some circuits for electromagnetic coupling have proved somewhat suitable for electrostatic coupling, circuit techniques exploiting the unique characteristics of electrostatic coupling have not been employed.

Therefore, there is a need for electronic circuits and methods of creating the same, which are optimized for the characteristics of electrostatic coupling of RFID tags.

DETAILED DESCRIPTION OF THE PREFERRED EMBODIMENT

Briefly, a radio frequency identification tag in accordance with the present invention includes a first antenna element, a second antenna element and a radio frequency identification circuit. The first antenna element is electrically isolated from the second antenna element. The radio frequency identification circuit has a first pad and a second pad. The first and second pads of the radio frequency identification circuit are coupled, respectively, to the first and second antenna elements. The radio frequency identification circuit includes a load modulation circuit coupled to at least one of the first or second pads to produce a load modulated signal that varies from a first amplitude to a second amplitude. The load modulation circuit has a modulation impedance and a predetermined voltage threshold that an input signal must exceed before the load modulated signal is produced. The first and second pads of the integrated circuit have a nonzero capacitance, as measured between the pads, hereinafter referred to as an input capacitance. In a preferred embodiment, the modulation impedance, predetermined threshold voltage of the modulation circuit and the input capacitance are optimized for electrostatic operation. Also, in one embodiment, the integrated circuit has a charge pump for providing a high programming voltage to a memory. The integrated circuit is optimized to reduce the stages in the charge pump or alternatively, in another embodiment, to eliminate the need for the charge pump.

A method in accordance with the present invention includes the steps of: a) providing a first antenna element; b) providing a second antenna element electrically isolated from the first antenna element; c) providing a radio frequency identification circuit having a first pad and second pad and a load modulation circuit that produces a modulated signal that varies from a first amplitude to a second amplitude based on a modulation impedance; and d) coupling the first and second antenna elements to the first and second pads, respectively, of the integrated circuit. The integrated circuit has a modulation impedance, threshold voltage and input capacitance, all of which are optimized for electrostatic operation.

Figure 1:
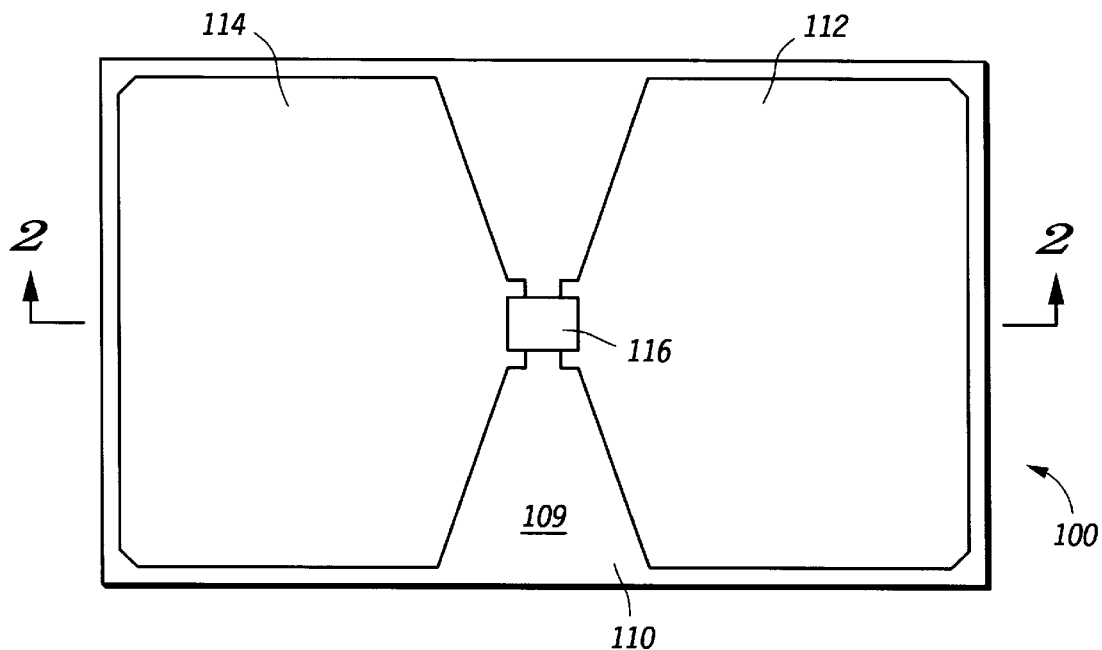
FIG. 1 is a back plan view of a radio frequency identification tag in accordance with a preferred embodiment of the present invention.

FIG. 1 shows the back of an embodiment of a radio frequency identification tag 100 in accordance with the present invention. Tag 100 has a substrate 110, a first antenna element 112, a second antenna element 114, and an integrated circuit 116. Substrate 110 provides a base for holding the components of tag 100. Formed on a back surface 109 of substrate 110 are first antenna element 112 and second antenna element 114. The first and second antenna elements 112, 114 are electrically isolated from each other. Integrated circuit 116 contains the electronics associated with tag 100 and is coupled to first antenna element 112 and second antenna element 114 via pads (not shown) on integrated circuit 116. Integrated circuit 116 is optimized for operation with tag 100 in accordance with the invention, as discussed below. Preferably, the front surface (not shown) of substrate 110 has indicia, which includes printed text, photographs, graphics or any other indicia.

Figure 2:
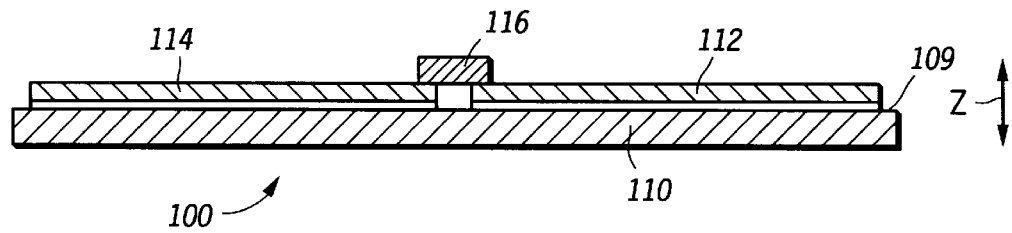
FIG. 2 is a cross-sectional view of the tag of FIG. 1 taken along line 2—2.

FIG. 2 is a cross-sectional view of tag 100 taken along line 2—2 of FIG. 1. As best seen in FIG. 2, first and second antenna elements 112, 114 are disposed on substrate member 110. Integrated circuit 116 is coupled to first antenna element 112 and second antenna element 114.

Substrate 110 provides the base for tag 100. Substrate 110 is composed of any non-conductive component. Suitable materials for substrate 110 include paper, acetate, polyester, polyethylene, polypropylene, polypropylene with calcium carbonate, polyvinyl chloride, or plastic. The selection of material for substrate 110 varies depending upon the application. For example, for an application wherein tag 100 is disposable, substrate 110 is preferably paper. For an application where tag 100 is durable and reusable, for example as an access control card, substrate 110 is preferably plastic, polyvinyl chloride or polyester.

First and second antenna elements 112, 114 are formed from numerous suitable conductive materials. The conductivity of antenna elements 112, 114 varies considerably with little or no performance degradation. For example, antenna elements 112, 114 with a resistivity from 0 ohms per square to 500 kilo ohms per square are operable for read-only applications. Antenna elements 112, 114 have a lower resistivity for write applications requiring higher programming current requirements. Suitable materials for antenna elements 112, 114 include conductive ink, wire, or a conductive metal material. More specifically, suitable materials for antenna elements 112, 114 include copper, graphite, metalized polyester, aluminum, silver ink and carbon ink. Antenna elements 112, 114 are placed on substrate 110 using any suitable process including printing, lamination, adhesively securing, and deposition. The shape of antenna elements 112, 114 is not limited, but preferably, for optimal performance, antenna elements 112, 114 consume substantially all of the available surface area on substrate 110. The impedance characteristics of antenna elements 112, 114 are preferably varied by the type of materials selected and by the dimensions and concentrations of the selected materials. For example, where conductive ink is used for antenna elements 112, 114, the deposition thickness of the conductive ink is used to vary the impedance characteristics. Unlike predecessor radio frequency identification tags that relied on electromagnetic coupling, antenna elements 112, 114 are not a coil.

Integrated circuit 116 houses the circuitry for powering up the radio frequency identification tag and sending a stored signal or information in response to receipt of an electrostatic exciter signal. For some applications, integrated circuit 116 includes the circuitry to write new information into the tag in response to an electrostatic exciter signal. The functions of integrated circuit 116 are discussed further below.

Integrated circuit 116 is coupled to first antenna element 112 and second antenna element 114 by any suitable manner that allows an electrical connection between the integrated circuit 116 and the antennas 112, 114, yet isolates antennas 112, 114 from each other. A preferred method for coupling integrated circuit 116 to antennas 112, 114 is a conductive anisotropic adhesive that conducts in the "Z" direction, as shown in FIG. 2. Alternatively, an isotropic adhesive (conductive in all directions) is used as long as the isotropic adhesive used to couple first antenna 112 is isolated from the isotropic adhesive used to couple the second antenna 114 to the integrated circuit 116. An alternate method for coupling integrated circuit 116 to antennas 112, 114 is with doublesided, (conductive, pressure sensitive adhesive tape. A preferred anisotropic adhesive tape is model No. 9703 sold by 3M Corporation of Minneapolis, Minn. A preferred isotropic adhesive tape is model 335-1 sold by Ablestik of Rancho Dominguez, Calif. As another alternative, an anisotropic adhesive is applied over the entire, or selected portions of antenna elements 112, 114, or on the side of integrated circuit 116 that will be in contact with antenna elements 112, 114.

Figure 3:
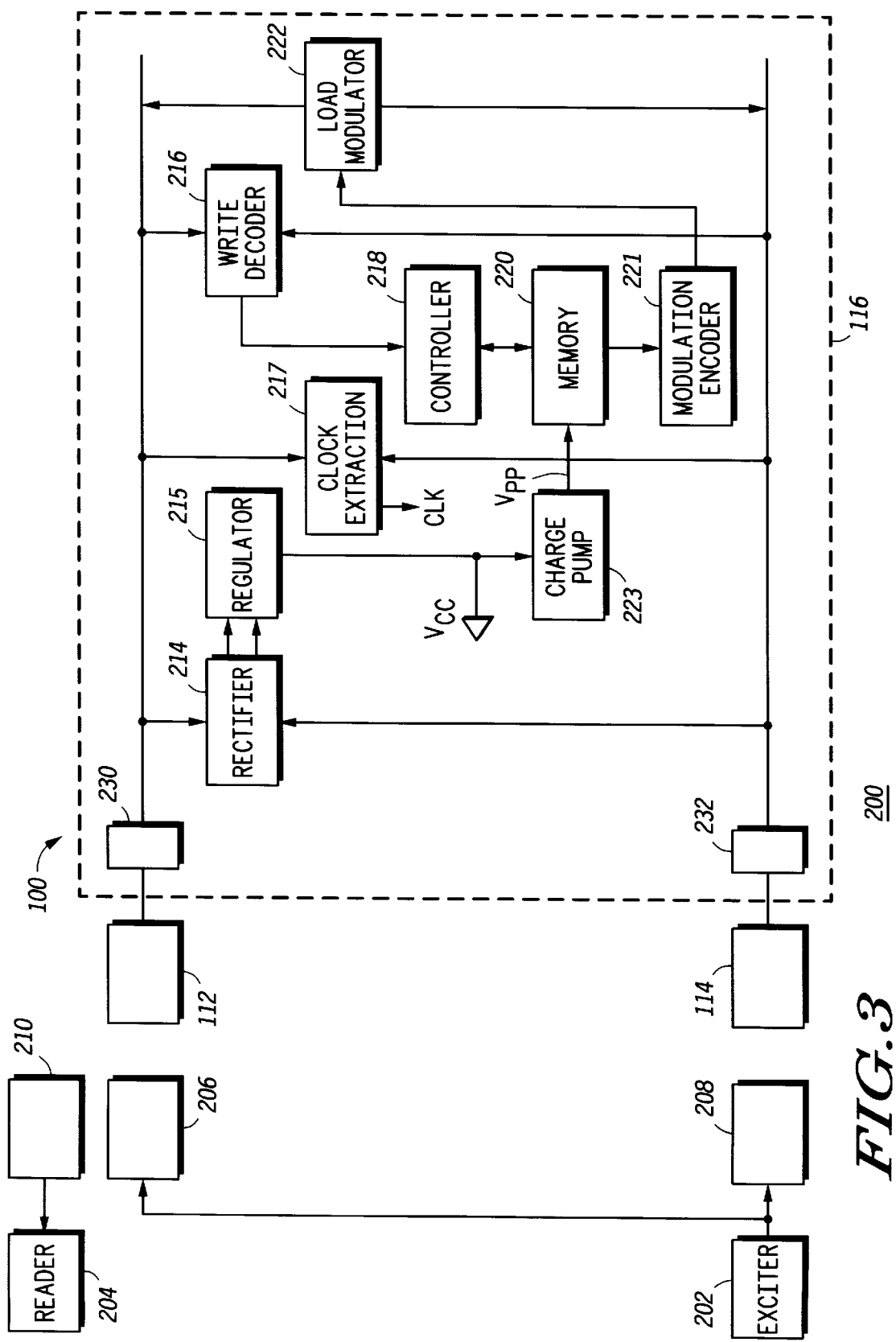
FIG. 3 is a block diagram of a radio frequency identification tag system in accordance with a preferred embodiment of the present invention.

FIG. 3 is a block diagram illustrating a radio frequency identification tag system 200 including an exciter 202, reader 204 and tag 100. Exciter 202 is coupled to a first electrostatic antenna element 206 and a second electrostatic antenna element 208. Reader 204 is coupled to an antenna element 210. Integrated circuit 116 is electrically connected to first electrostatic antenna element 112 and second electrostatic antenna element 114 via pads 230 and 232, respectively, to form tag 100. Exciter 202 generates a signal that is electrostatically coupled to integrated circuit 116 from electrostatic antenna elements 206, 208 to electrostatic antenna elements 112, 114. The signal generated by exciter 202 may include information that is to be written to integrated circuit 116. In response to the signal from exciter 202, circuit 116 converts and regulates the coupled voltage, writes the appropriate information and generates a read signal that is electrostatically coupled over the air to reader 204 via electrostatic antenna element 210. Reader 204 reads the signal to decode the information for use by other systems (not shown).

Integrated circuit 116 includes a rectifier 214, a voltage regulator 215, a write decoder 216, a clock extraction circuit 217, a controller 218, a memory 220, a modulation encoder 221, a load modulator 222 and a charge pump 223. Rectifier 214 is coupled to antenna elements 112, 114 via pads 230, 232 to receive the electrostatically coupled signal from exciter 202. This alternating current (A.C.) signal is rectified by rectifier 214 to produce a direct current (D.C.) signal that is then regulated by voltage regulator 215 to provide a power supply voltage Vcc for integrated circuit 116. The A.C. signal from exciter 202 is received by clock extraction circuit 217, which extracts a clock signal CLK that is used for clocking the components on integrated circuit 116. The A.C. signal from exciter 202 is passed to write decoder 216. Write decoder 216 decodes the information modulated into the signal by exciter 202 to determine the appropriate action to be taken by integrated circuit 116. More specifically, write decoder 216 is coupled to controller 218, which controls a memory 220, which is written in response to an appropriate signal from exciter 202 and/or read from in response to an appropriate signal from exciter 202. A write decoder is described in commonly assigned U.S. patent application Ser. No. 09/151,418, filed Sep. 11, 1998 by Victor Allen Vega, titled "A Contactless Capacitive Data Transmission System and Method", the disclosure of which is hereby incorporated by reference. Information read from memory 220 is encoded into a modulated signal by modulation encoder 221. Modulation encoder 221 uses any suitable means of modulation to encode information read from memory 220, including phase modulation, amplitude modulation, frequency modulation, or a combination of these. More specifically, modulation encoder 221 uses amplitude shift keying (ASK), frequency shift keying (FSK), or phase shift keying (PSK). The modulated signal from modulation encoder 221 is received by load modulator 222 which provides a load modulated signal that is electrostatically coupled through at least one of antenna elements 112, 114 to be received by reader 204. Load modulator 222 and alternative embodiments for this function are discussed further below. Charge pump 223 generates a high voltage Vpp required by memory 220 for programming.

Figure 4:
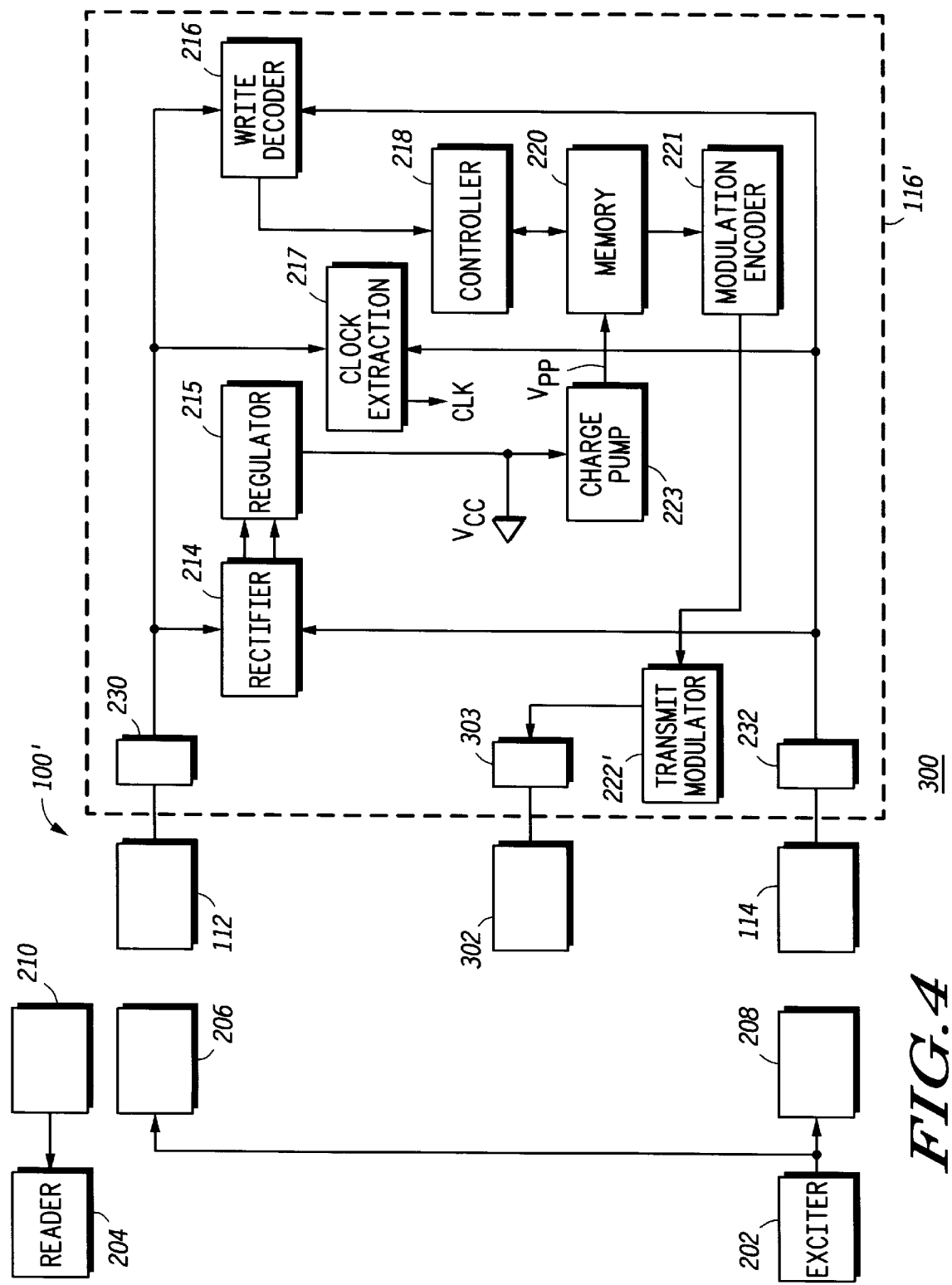
FIG. 4 is a block diagram of another radio frequency identification tag system in accordance with a preferred embodiment of the present invention.

FIG. 4 is a block diagram illustrating an alternate radio frequency identification tag system 300 in accordance with the present invention. Radio frequency identification tag system 300 includes a slightly modified integrated circuit 116'. The system 300 is similar to the system 200 except that load modulator 222 of integrated circuit 116 is replaced by transmit modulator 222' and is not coupled to first and second electrostatic antenna elements 112, 114, but is coupled to a separate electrostatic antenna element 302 via a pad 303. This embodiment advantageously has a separate electrostatic antenna element 302 dedicated for data transmission. Transmit modulator 222' couples a modulated signal based on modulation encoder 221 to antenna element 302 via pad 303.

Figure 5:
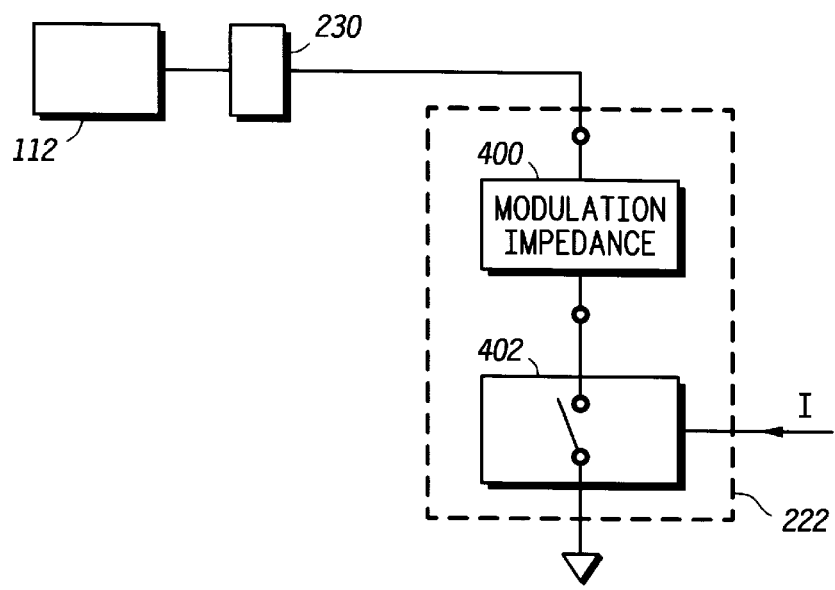
FIG. 5 is a schematic of a load modulation circuit of a radio frequency identification tag in accordance with a preferred embodiment of the present invention.

FIG. 5 is a schematic diagram of load modulator 222, in accordance with the present invention. Load modulator 222 is shown connected to pad 230, which is coupled to antenna element 112. Load modulator 222 includes a modulation impedance 400 and a modulation switch 402. Modulation impedance 400 is coupled in series to pad 230 and modulation switch 402. Modulation switch 402 is coupled in series with modulation impedance 400 and common. Modulation switch 402 receives an input signal I, which preferably is a modulated bit stream of information from modulation encoder 221 (FIG. 3). Input signal I is used to control the "on" and "off" operation of modulation switch 402.

Load modulator 222 drives pad 230 by reflective load modulation, which is also known as backscatter modulation, to produce an amplitude modulated signal, often referred to as a dampened or load modulated signal. In response to the differences in voltage levels for input signal I, for example, a logic "high" versus a logic "low," modulation switch 402 is turned "off" or "on." When modulation switch 402 is on, that is, a connection is made, pad 230 is loaded by modulation impedance 400. This varies the amplitude of any signal on pad 230. When modulation switch 402 is off, any signal on pad 230 is not so loaded.

Figure 6:
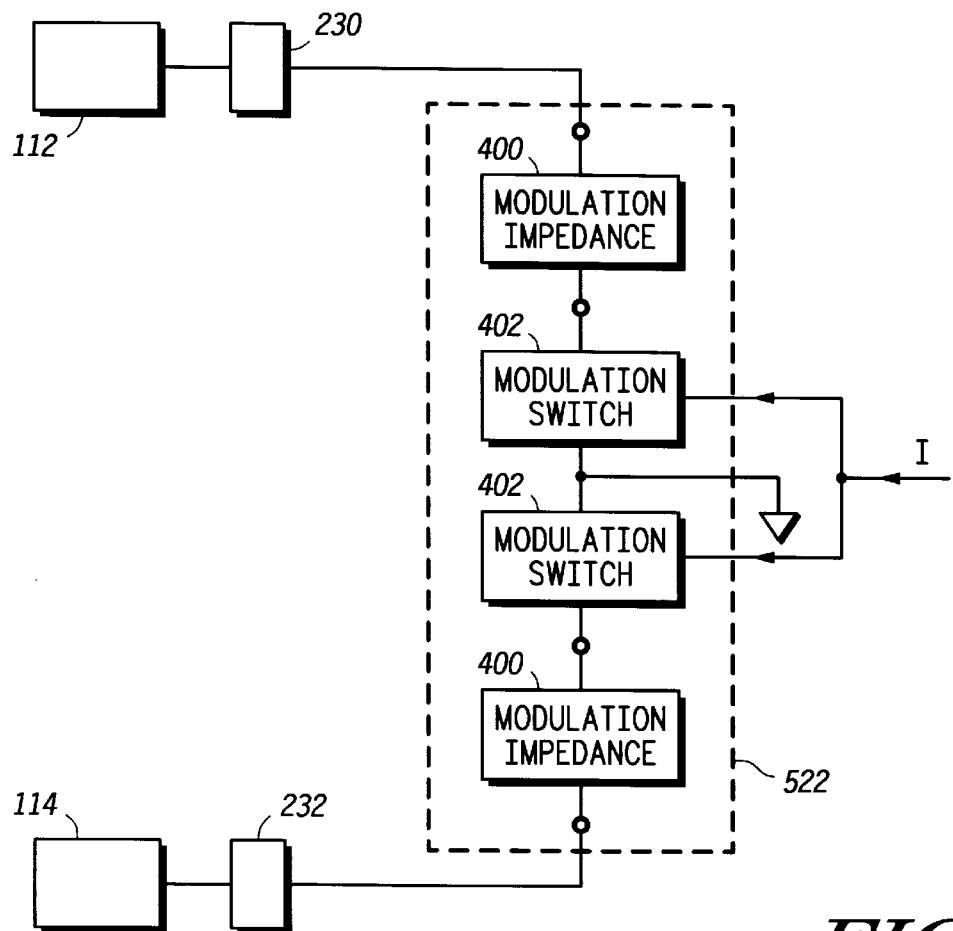
FIG. 6 is a schematic of an alternate load modulation circuit of a radio frequency identification tag in accordance with a preferred embodiment of the present invention.

FIG. 6 is a block diagram of an alternate load modulation circuit in accordance with the present invention, including load modulator 522. Load modulator 522 is similar to load modulator 222, except that load modulator 522 load modulates pad 230 and pad 232. Load modulator 522 consists of two load modulators 222, one connected to pad 230 and the other connected to pad 232. The modulation circuit shown in FIG. 6 is referred to as a symmetrical load modulation circuit in that signals on both pad 230 and pad 232 are load modulated in response to an input signal. The load modulation circuit shown in FIG. 5 is referred to as an asymmetrical load modulation circuit in that only a signal on one pad, pad 230, is load modulated.

Figure 8A:
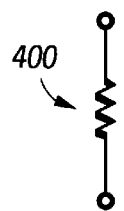
FIGS. 8A–D are embodiments of modulation impedance circuits for a load modulated circuit in accordance with a preferred embodiment of the present invention.
Figure 8B:
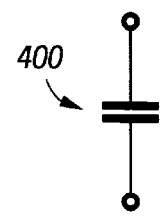
Figure 8C:
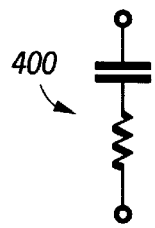
Figure 8D:
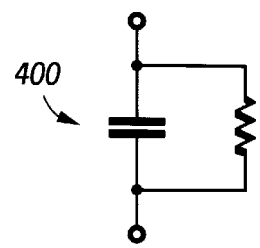

Modulation impedance 400 is implemented in numerous ways. Example embodiments are shown in FIGS. 8A through 8D. FIG. 8A shows modulation impedance 400 implemented as a resistor. FIG. 8B shows modulation impedance 400 implemented as a capacitor. FIG. 8C shows modulation impedance 400 implemented as a series connected resistor and capacitor. FIG. 8D shows modulation impedance 400 implemented as a resistor and capacitor connected in parallel. Other embodiments are possible and known to those of skill in the art, including active devices, for example, field-effect transistors (FETs).

Figure 9A:
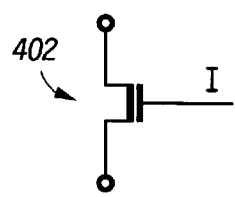
FIGS. 9A–D are embodiments of modulation switches for a load modulated circuit in accordance with a preferred embodiment of the present invention.
Figure 9B:
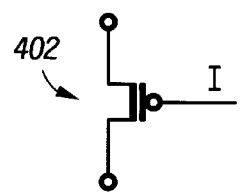
Figure 9C:
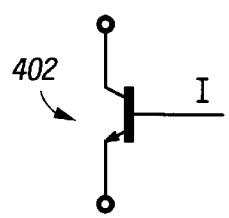
Figure 9D:
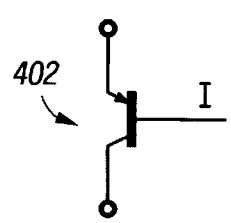

Modulation switch 402 is shown in FIGS. 5 and 6 as a switch, but is preferably implemented as a transistor. Numerous implementations for modulation switch 402 are known. Example embodiments are shown in FIGS. 9A through 9D. FIG. 9A shows modulation switch 402 implemented as an N-channel FET with the input signal I coupled to the gate. FIG. 9B shows modulation switch 402 implemented as a P-channel FET with the input signal I connected at the gate. FIG. 9C shows modulation switch 402 implemented as an NPN transistor with input signal I coupled to the base. FIG. 9D shows modulation switch 402 implemented as a PNP transistor with input signal I coupled to the base.

Figure 7:
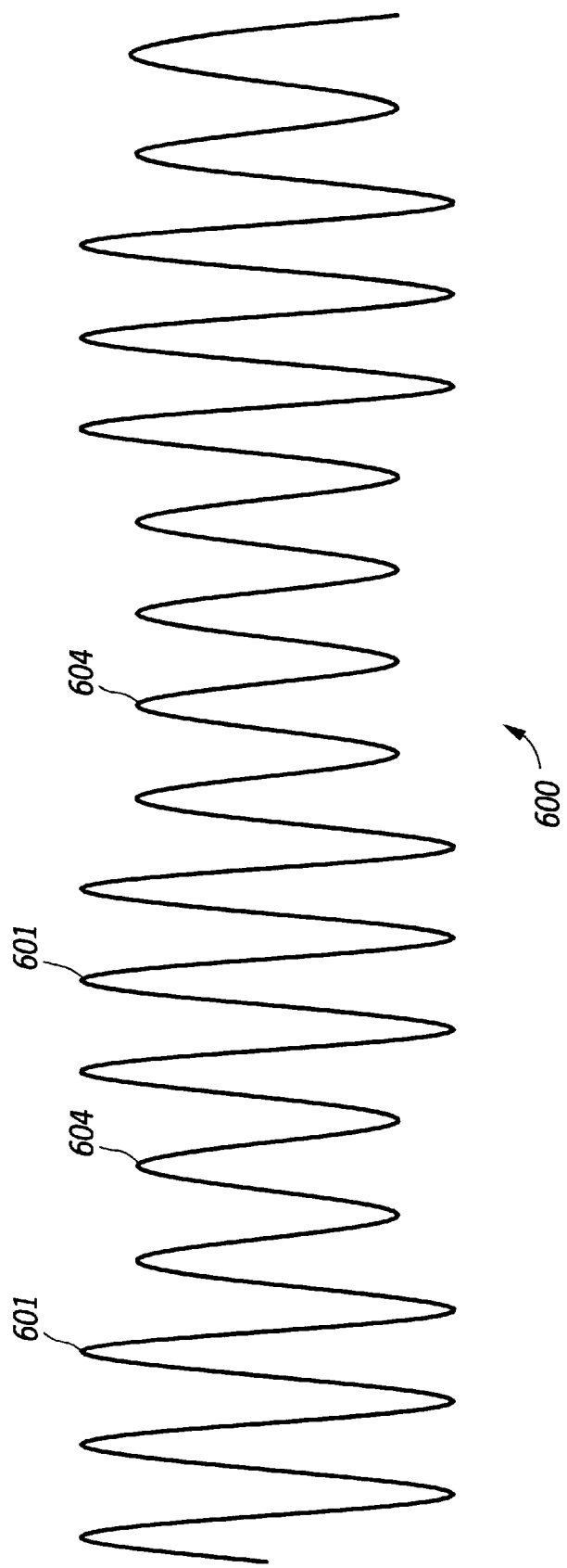
FIG. 7 is a diagram illustrating an example load modulated signal from a load modulation circuit in accordance with a preferred embodiment of the present invention.

FIG. 7 shows an example of a loaded or dampened amplitude modulated signal produced by load modulator 222 or load modulator 522 at pad 230 or pad 232. As shown in FIG. 6, the modulated signal 600 has a first amplitude 601 and a second lower amplitude 604. The amplitude of modulated signal 600 is controlled by the load modulation circuit in response to the input signal I. The magnitude of the amplitude of modulated signal 600 is in part determined by the value of modulation impedance 400. In electromagnetic radio frequency identification tags, modulation impedance 400 has typically been made as low as approximately 100 ohms. However, for electrostatic radio frequency identification systems, the modulation impedance is chosen such that the modulation current is large enough for adequate operation. For electrostatic radio frequency identification tags, better performance and efficiency is achieved with a higher modulation impedance. Preferably, for electrostatic systems, the modulation impedance is at least 0.1 kilo ohm and, most preferably, in the range of 1.5 to 10 kilo ohms. The larger modulation impedance improves read ranges and also reduces the current consumption of the chip. Another advantage is reduced emissions.

Antenna elements 112 and 114, which are connected in series with pad 230 and pad 232, respectively, affect the total modulation impedance of the load modulation circuit. That is, the impedance of antenna elements 112, 114 is combined with the associated modulation impedance to create an effective modulation impedance. Also, the impedance of antenna elements 112, 114 may be considered as an input series resistance to protect integrated circuit 116 from electrostatic discharge damage. Preferably, integrated circuit 116 is designed to minimize the effects of the impedance of antenna elements 112, 114.

Figure 10:
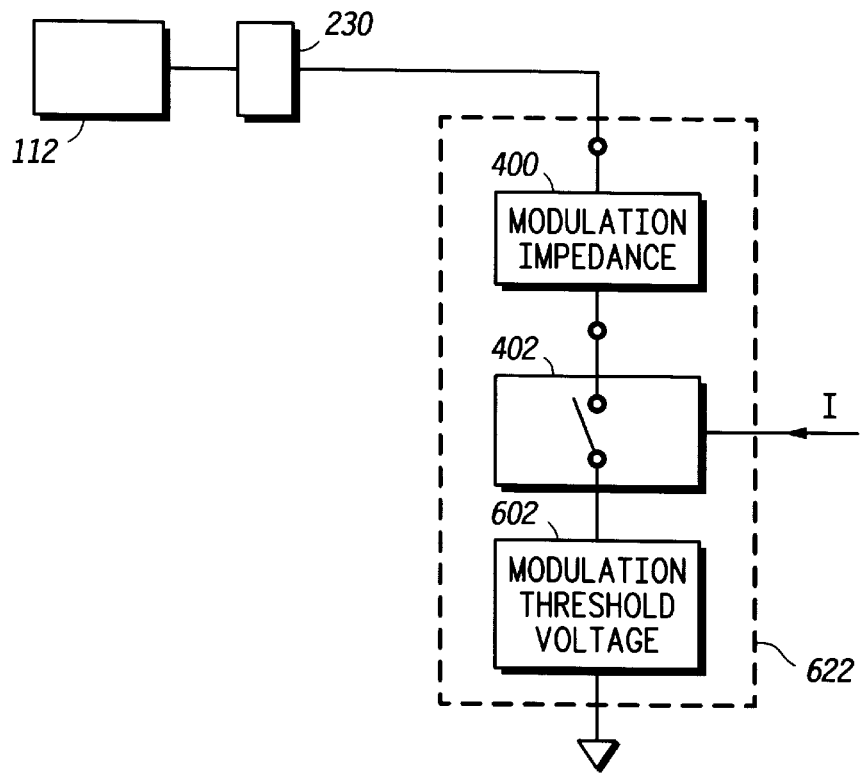
FIG. 10 is a schematic of an alternate load modulation circuit in accordance with a preferred embodiment of the present invention wherein the load modulation circuit includes a modulation threshold voltage.

FIG. 10 shows an alternate load modulation circuit in accordance with the present invention, including load modulator 622. Load modulator 622 is shown connected in series with pad 230 and common. Load modulator 622 is similar to load modulator 222, except that a modulation threshold voltage is shown schematically in series with modulation switch 402 and common. Modulation threshold voltage 602 requires that the input signal I achieve a certain threshold voltage before modulation switch 402 is turned on to load or dampen a signal on pad 230. Indeed, modulation switch 402 typically, inherently has a threshold voltage that input signal I must exceed prior to a signal on pad 230 being dampened or load modulated. However, for certain applications, it is desirable to adjust the threshold voltage.

Figure 11A:
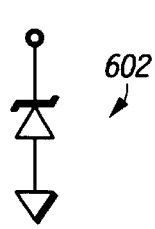
FIGS. 11A–C are embodiments of threshold voltage circuits for a load modulated circuit in accordance with a preferred embodiment of the present invention.
Figure 11B:
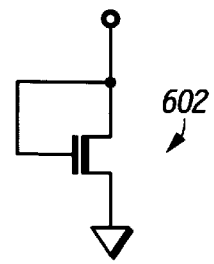
Figure 11C:
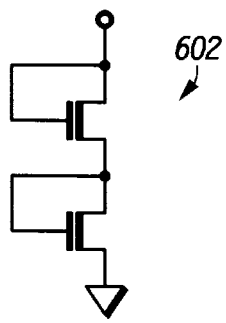

Modulation threshold voltage 602 is implemented in numerous ways. Example embodiments for modulation threshold voltage 602 are shown in FIGS. 11A through 11C. FIG. 11A shows modulation threshold voltage 602 implemented as a zener diode of a certain voltage. FIG. 11B shows modulation thresh old voltage 602 implemented as an N-channel FET with the gate connected to the source. FIG. 11C shows modulation threshold voltage 602 implemented as two N-channel FETs in series, both having their gates connected to their respective sources. Modulation threshold voltage 602 is alternatively implemented in a number of other ways, including stacking additional FETs in series or using alternative circuit components. Modulation threshold voltage 602 is alternatively adjusted by semiconductor processing as is well known in the art. Also, modulation threshold voltage 602 is alternatively combined with modulation switch 402, as discussed further below with respect to FIG. 13.

Figure 12:
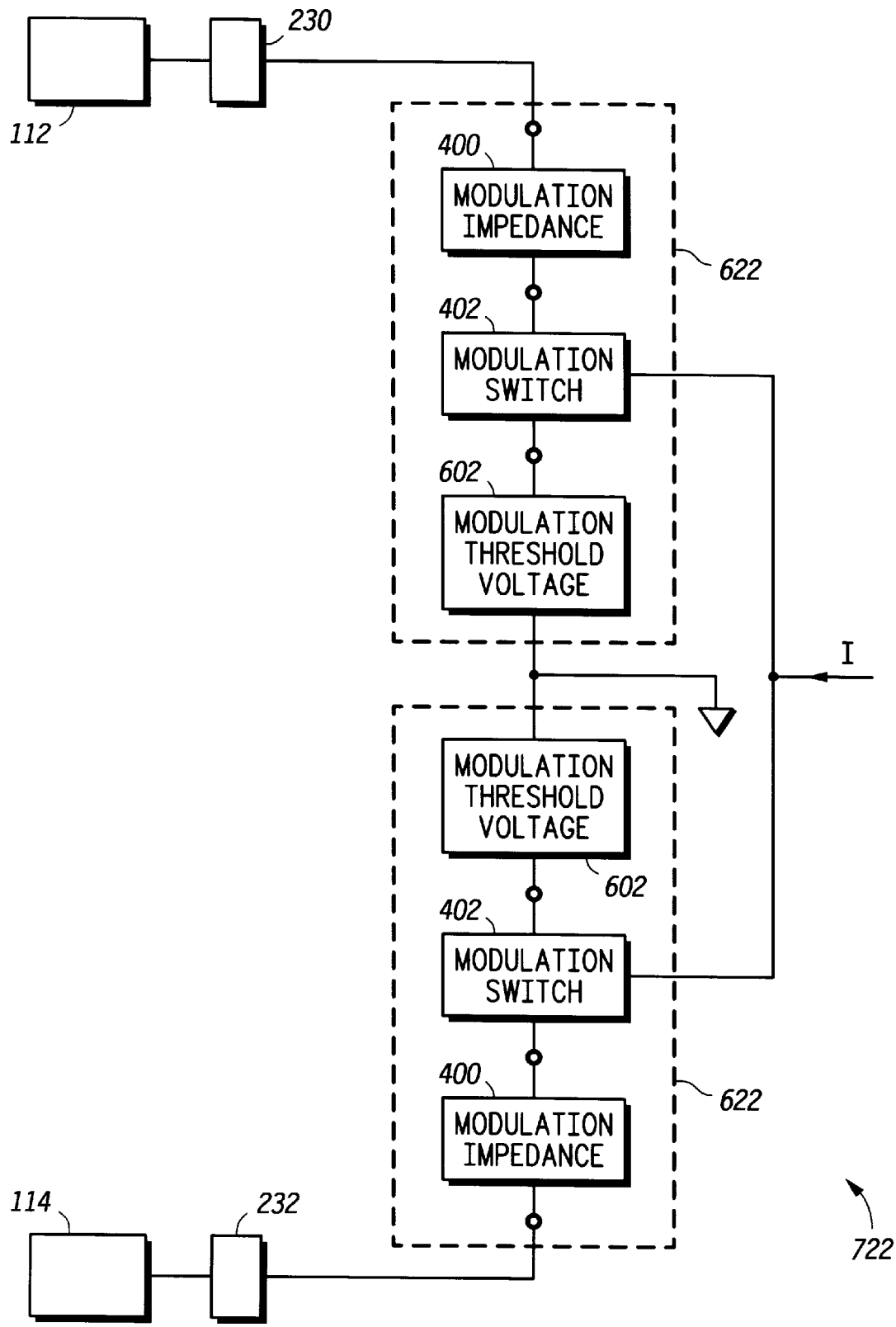
FIG. 12 is a schematic of another alternate load modulation circuit in accordance with a preferred embodiment of the present invention wherein the load modulation circuit includes a modulation threshold voltage.

FIG. 12 is a block diagram of a preferred alternate load modulator 722 in accordance with the present invention. Load modulator 722 is a symmetric load modulator. That is, load modulator 722 modulates signals on pad 230 and pad 232. Load modulator 722 includes two load modulators 622, one of which is connected to pad 230 and the other connected to pad 232.

Figure 13:
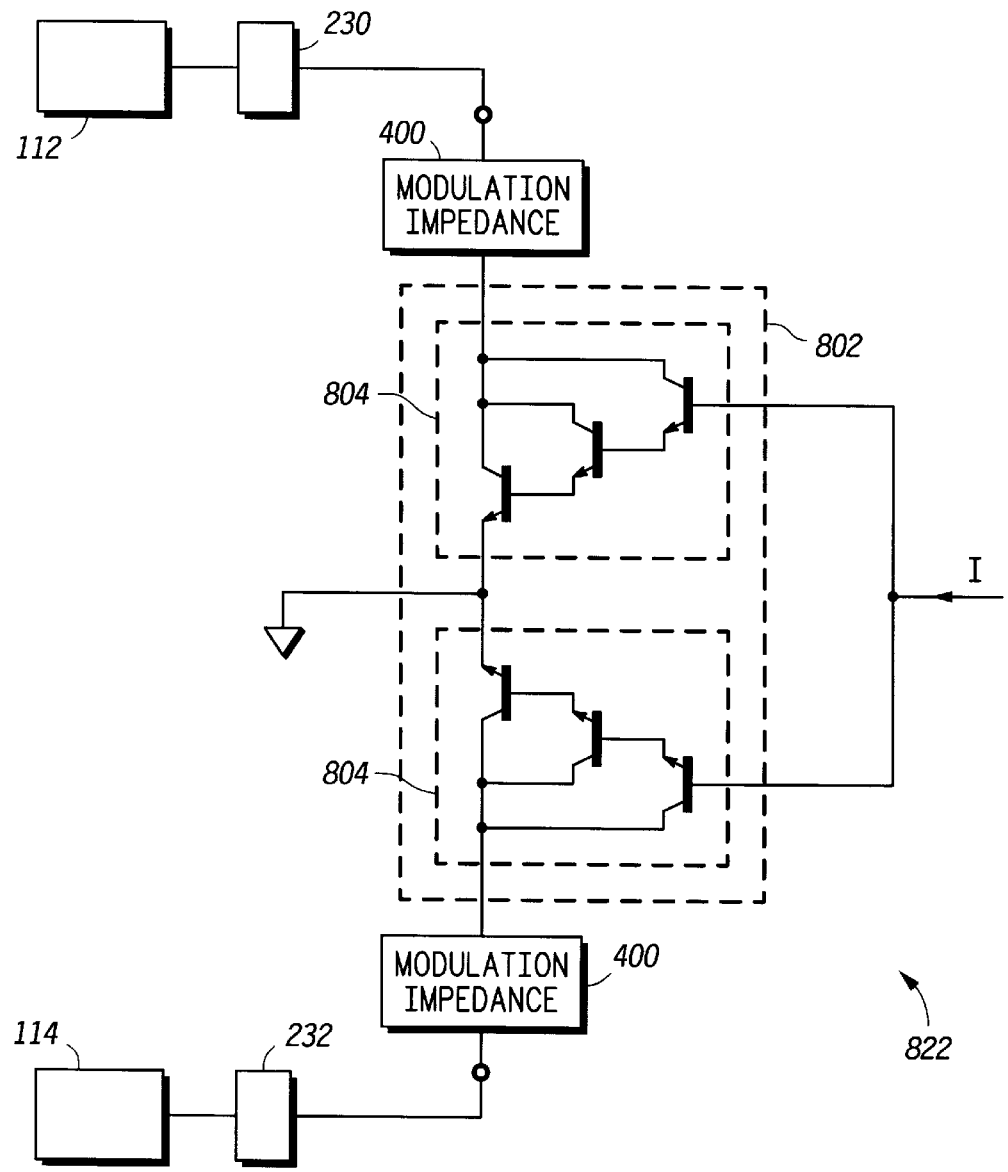
FIG. 13 is a schematic of another alternate load modulation circuit in accordance with a preferred embodiment of the present invention wherein the load modulation circuit includes a modulation switch incorporating a modulation threshold voltage.

FIG. 13 is a schematic diagram of another alternate embodiment of a load modulation circuit in accordance with the present invention, including load modulator 822. Load modulator 822 is symmetrical. Load modulator 822 includes modulation impedance 400 and modulation switch 802, which has an inherent threshold voltage. Modulation switch 802 includes two groups 804 of nested transistors. Each group 804 of nested transistors includes three nested transistors connected in a Darlington configuration with the collectors tied in common and the emitter of one transistor connected to the base of the succeeding transistor. The number of transistors in the Darlington configuration is variable depending upon the desired threshold voltage. For the circuit shown in FIG. 13 with three nested transistors, the equivalent of three times the threshold voltage of each transistor is the required modulation threshold voltage.

The ability of the input signal I to achieve a certain threshold voltage is determined in part by the power supply voltage produced by rectifier 214. This power supply voltage is in turn a function of the alignment of the tag with the exciter/reader, the orientation of the tag with the exciter/reader and the distance between the tag and the exciter/reader. Hence, the distance between the tag and exciter affects the ability of the input signal to attain a threshold voltage to produce a modulated signal. For improved read ranges in electrostatic applications, it is desirable to reduce the threshold voltage required to generate a modulated signal to allow communication between the tag and a exciter/reader at longer read distances. Preferably, the threshold voltage is approximately 800 millivolts and at least less than one volt.

The load modulators shown in FIGS. 5, 6, 10, 12 and 13 are all shown as loading a modulation impedance by switching a connection to common. However, common need not be ground but could be any available voltage reference including the low supply voltage or a voltage higher than the supply voltage. Alternatively, the load modulator loads one pad by switching a connection to the other pad. That is, rather than a connection to common, the load modulator would be connected between the pads. For example, load modulator 222 of FIG. 5 could connect to pad 232 rather than to common, as is shown in FIG. 5.

In electromagnetic RFID applications, the input capacitance measured between pads 230, 232 of integrated circuit 116 is typically not minimized, because this input capacitance is negligible after the integrated circuit is connected to an external capacitor and coil. However, in electrostatic RFID applications, where no external capacitor and coil are required, the input capacitance of the pads 230, 232 on integrated circuit 116 becomes quite important. It has been found that the input capacitance must be minimized for optimal use of integrated circuit 116 in electrostatic RFID applications. Preferably the input capacitance between pads 230, 232 is approximately 5 picofarads and at least less than approximately 10 picofarads.

Figure 14:
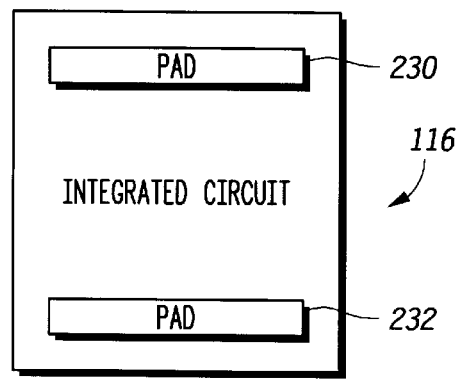
FIG. 14 is a plan view of a die for a radio frequency identification circuit in accordance with a preferred embodiment of the present invention.

For electrostatic RFID systems, it is desirable to have pads 230, 232 be as large as possible without substantially increasing the die size and parasitic capacitance. It is also desirable to have the pads spaced as far apart as the die will allow. That is, the pitch between pads is maximized. This arrangement advantageously facilitates high volume manufacture of a tag incorporating the integrated circuit. FIG. 14 shows a plan view of a layout of a die or integrated circuit 116 allowing an optimal placement of pads 230, 232. The die has a rectangular configuration. The pads are spaced apart along the longer dimension of the die to provide maximum spacing between the pads, ie., maximum pad pitch.

Figure 15:
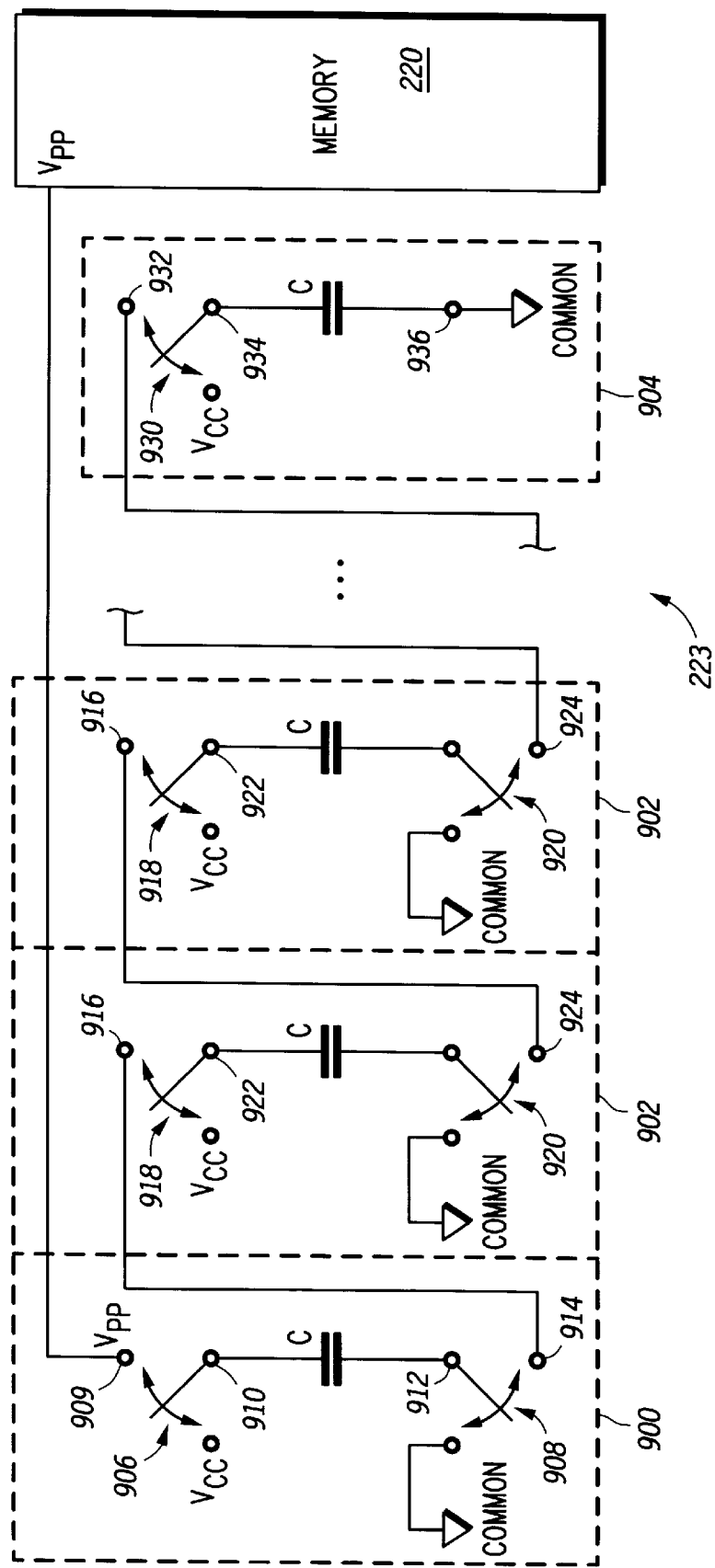
FIG. 15 is a schematic of a charge pump circuit in accordance with a preferred embodiment of the present invention.

FIG. 15 shows schematically charge pump 223 and its connection to memory 220. Memory 220 is preferably an EEPROM, which requires a high voltage Vpp for writing to the EEPROM. Alternatively, memory 220 is preferably, ferroelectric RAM, which does not need a high programming voltage. However, other types of memory are suitable for memory 220.

Charge pump 223 generates a high voltage Vpp required by memory 220. Charge pump 223 has stages of capacitors that are each charged to a voltage, preferably, approximately the power supply voltage Vcc, then interconnected together to supply the high voltage Vpp required for programming the EEPROM. Typically Vpp is around 15–18 volts.

Charge pump 223 includes a first stage 900, a plurality of intermediate stages 902 and a final stage 904. For simplicity, in FIG. 15, two intermediate stages 902 are shown in detail with a break between the last intermediate stage shown and final stage 904. A plurality of intermediate stages 902 are typically included in charge pump 223 with connections as shown between intermediate stages 902. The number of intermediate stages is determined in part by the voltage requirement for Vpp and by the voltage used to charge the stages.

First stage 900 includes a capacitor C with switches 906, 908. Switch 906 connects a terminal 910 of capacitor C alternatively between the power supply voltage Vcc and a terminal 909 that serves as the high voltage Vpp for memory 220. Switch 908 connects a terminal 912 of capacitor C alternatively between common and a terminal 914, which is connected to a terminal 916 of the next stage of the charge pump.

Intermediate stages 902 include a capacitor C with switches 918, 920. Switch 918 connects a terminal 922 of capacitor C alternatively between power supply voltage Vcc and terminal 916, which is connected to the prior stage of charge pump 223. Switch 920 connects a terminal of capacitor C alternatively between common and a terminal 924, which is connected to terminal 916 of the next stage of charge pump 223.

Final stage 904 includes a capacitor C and one switch 930. Switch 930 connects a terminal 934 of capacitor C alternatively with power supply voltage Vcc and terminal 932, which is connected to terminal 924 of the previous intermediate stage (not shown) of charge pump 223. Terminal 936 of capacitor C is connected to common.

Though shown as physical switches in FIG. 15, switches 906, 908, 918, 920 and 930 are preferably transistors, including bipolar and field-effect transistors connected and controlled in a manner known to those of skill in the art.

To facilitate charging charge pump 223, switch 906 of first stage 900, switch 918 of each intermediate stage 902 and switch 930 of final stage 904 are switched to the power supply voltage Vcc. Also switch 908 of first stage 900 and switch 920 of each intermediate stage 902 are all switched to common and held for sufficient amount of time to allow charging of capacitors C in all the stages. Then switches 906, 908, 918, 920 and 930 are switched to their alternate positions. That is, switch 906 is connected to high voltage Vpp; switch 908 is switched to terminal 914, which provides a connection to the next stage; each switch 918 is connected to terminal 916, which provides a connection to the previous stage; each switch 920 is connected to terminal 924, which provides a connection to the next stage; and switch 930 is connected to terminal 932, which provides a connection to the previous stage.

Typically, for an electromagnetic RFID application Vcc is approximately 2 volts or less and the high voltage Vpp required by the memory 220 is eighteen (18) volts. Under these circumstances, at least seven intermediate stages, a first stage and a final stage are provided for charge pump 223. In electrostatic RFID applications, the voltages coupled between the tag and exciter are substantially higher than the voltages induced in a coil in an electromagnetic application. This is explained in part due to the differences in the relationship of coupling voltage to distance in an electrostatic field versus an electromagnetic field. In an electromagnetic field the near field voltage is related to distance (D) by a function of $1/D^3$. However, the near field voltage is related to distance in an electrostatic field by a function closer to $1/D^2$ or $1/D$. This advantageously allows in electrostatic applications a higher power supply voltage Vcc to be readily developed or an additional voltage higher than the power supply voltage to be readily developed. In addition, the input impedance of an electrostatic tag is much higher than the input impedance of an electromagnetic tag.

In accordance with the invention, an integrated circuit for RFID applications is optimized for electrostatic operation by using a voltage higher than the power supply voltage to charge the stages of the charge pump. This reduces the number of stages required for the charge pump. Also, since charging the charge pump requires energy and hence power, less stages advantageously requires less power. For example, in a preferred embodiment, a voltage of 4 volts is used to charge a charge pump with 2 intermediate stages, a first stage and a final stage, to produce high voltage Vpp of 16 volts for programming the memory.

Figure 16:
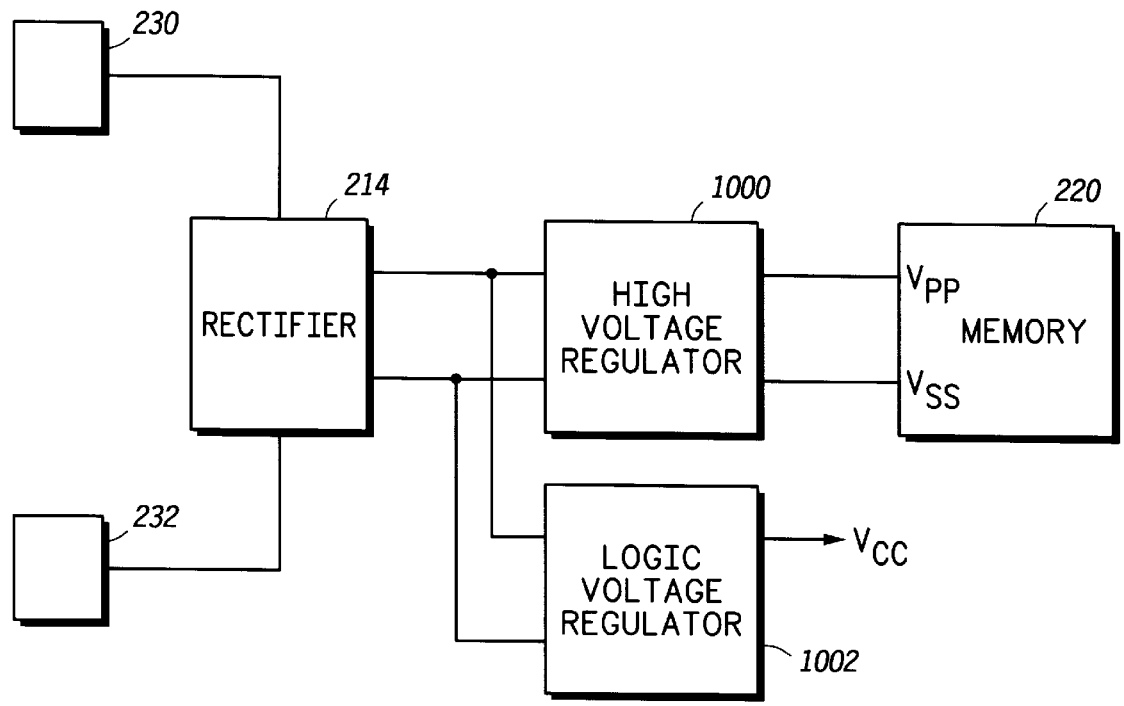
FIG. 16 is a block diagram of a circuit eliminating the need for a charge pump in a radio frequency identification tag circuit in accordance with a preferred embodiment of the present invention.

Alternatively, in accordance with an alternate preferred embodiment where an integrated circuit is optimized for electrostatic operation, a high voltage Vpp is generated directly from the voltage coupled to the tag from the exciter, eliminating the need for a charge pump. FIG. 16 shows a block diagram of a radio frequency identification tag circuit with a memory requiring a high programming voltage Vpp, but this circuit does not employ a charge pump in accordance with the present invention.

The circuit shown in FIG. 16 includes rectifier 214, high voltage regulator 1000, logic voltage regulator 1002, memory 220 and pads 230, 232. As in integrated circuit 116, rectifier 214 is coupled to pads 230, 232 to receive an electrostatic A.C. voltage that is rectified by rectifier 214 into a D.C. voltage. High voltage regulator 1000 is coupled to the D.C. voltage from the rectifier 214. High voltage regulator 1000 produces a regulated high voltage Vpp that is used for programming memory 220. Logic voltage regulator 1002 is also coupled to the D.C. voltage output from rectifier 214. Logic voltage regulator 1002 regulates and limits the D.C. voltage from rectifier 214 to produce a power supply voltage Vcc.

Figure 17:
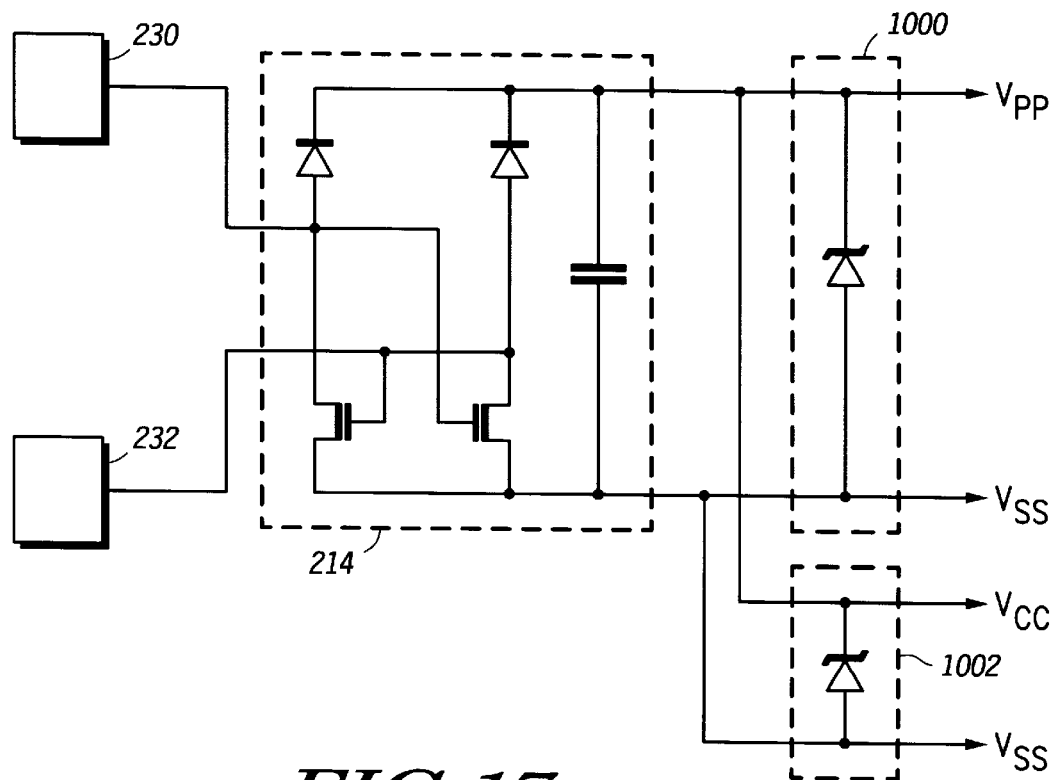
FIG. 17 is a schematic of an embodiment of the circuit of FIG. 16.

Rectifier 214 is implemented in any suitable manner, including as a full-wave rectifier, a half-synchronized, full-wave rectifier or full-synchronized, full-wave rectifier or any other suitable rectifier. High voltage regulator 1000 and logic voltage regulator 1002 are implemented in any manner that provides suitable D.C. voltages, including series pass regulation or shunt regulation or any other regulation scheme. FIG. 17 is a schematic showing an embodiment of the circuit shown in FIG. 16, where rectifier 214 is shown implemented as a half-synchronized, full-wave rectifier and high voltage regulator 1000 and logic voltage regulator 1002 are both shown implemented as shunt regulators using a zener diode to limit the output voltages.

In some applications employing radio frequency identification tags, it is desirable for the radio frequency identification tag to have a circuit state. For example, in electronic article surveillance (EAS) applications, typically, the detection of a circuit state is used to determine whether an article is authorized to be removed from a particular area. A tag with the state information receives an exciter signal and responds with a modulated signal if removal is not authorized, but does not respond with the modulated signal if removal is authorized. The circuit state, in effect, determines whether a signal is modulated or not. Radio frequency identification tags are applicable in EAS applications by maintaining a programmable circuit state as discussed in pending U.S. patent application Ser. No. 09/045,357, filed Mar. 20, 1998 by Victor Allen Vega, et al., titled "Radio Frequency Identification Tag With A Programmable Circuit State." In essence, the load modulated signal from a tag is inhibited in EAS applications based on a programmable circuit state.

Figure 18:
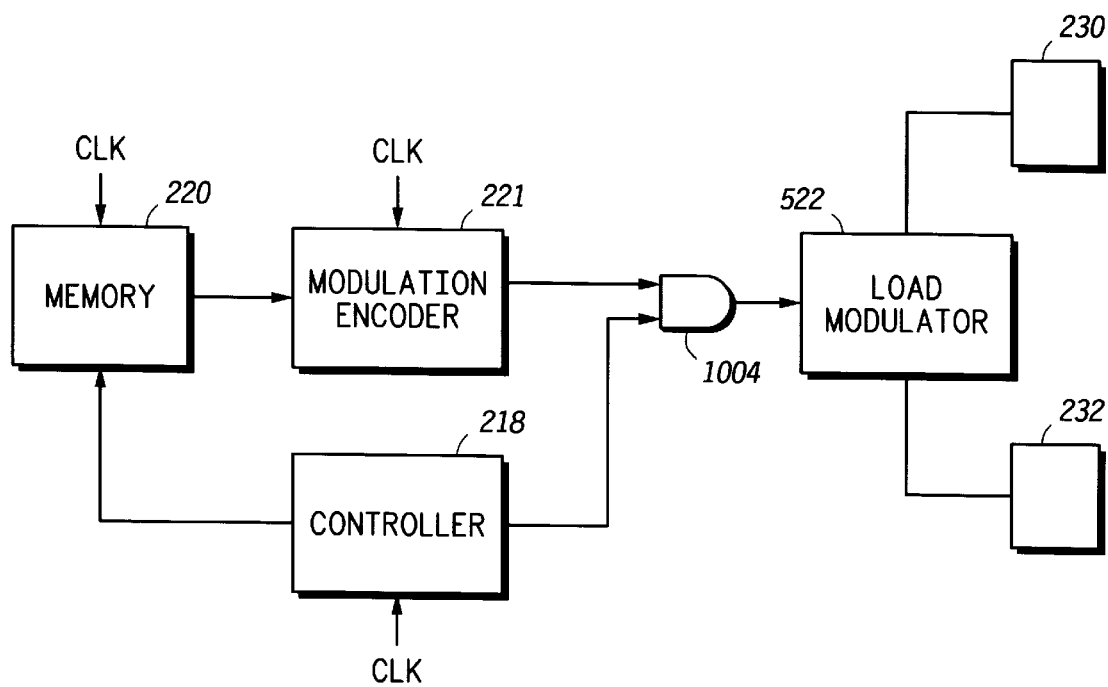
FIG. 18 is a schematic of an embodiment of a radio frequency identification tag circuit in accordance with a preferred embodiment of the present invention wherein the load modulation circuit includes a circuit to selectively defeat load modulation.

FIG. 18 shows a schematic diagram of a circuit that implements a feature to defeat or inhibit load modulation based on a circuit state. The circuit includes memory 220, modulation encoder 221, controller 218, load modulator 522, gate 1004, and pads 230, 232. Memory 220 is coupled to controller 218 and modulation encoder 221 in the manner described above with respect to FIG. 3. The modulated signal output by modulation encoder 221 is received at one input of gate 1004. Controller 218 provides the other input to gate 1004. Gate 1004 is shown as an AND gate, although other logic gates and combinations of logic gates are configurable as gate 1004. The output of gate 1004 is the input signal I to load modulator 522. In accordance with the present invention, the output of controller 218, that is, the input to gate 1004, is set at a logic low level to force the input signal I to stay at a logic low level regardless of the output from modulation encoder 221. Alternatively, if the output of controller 218 is placed in a logic high state, the output from modulation encoder 221 is reflected onto the input signal I by gate 1004. Hence, the output from the controller provides a feature whereby the load modulator is enabled or disabled based on the output from the controller 218. Controller 218 retains a circuit state to determine the output used to enable or defeat the output from modulation encoder 221. In some applications, this feature is used to prevent modulation for a predetermined period of time so as not to interfere with electronic article surveillance systems. In some embodiments, this feature is used to delay the start of modulation for a specified period of time, for example, to allow the circuit to reach a stable power-up state.

Figure 19:
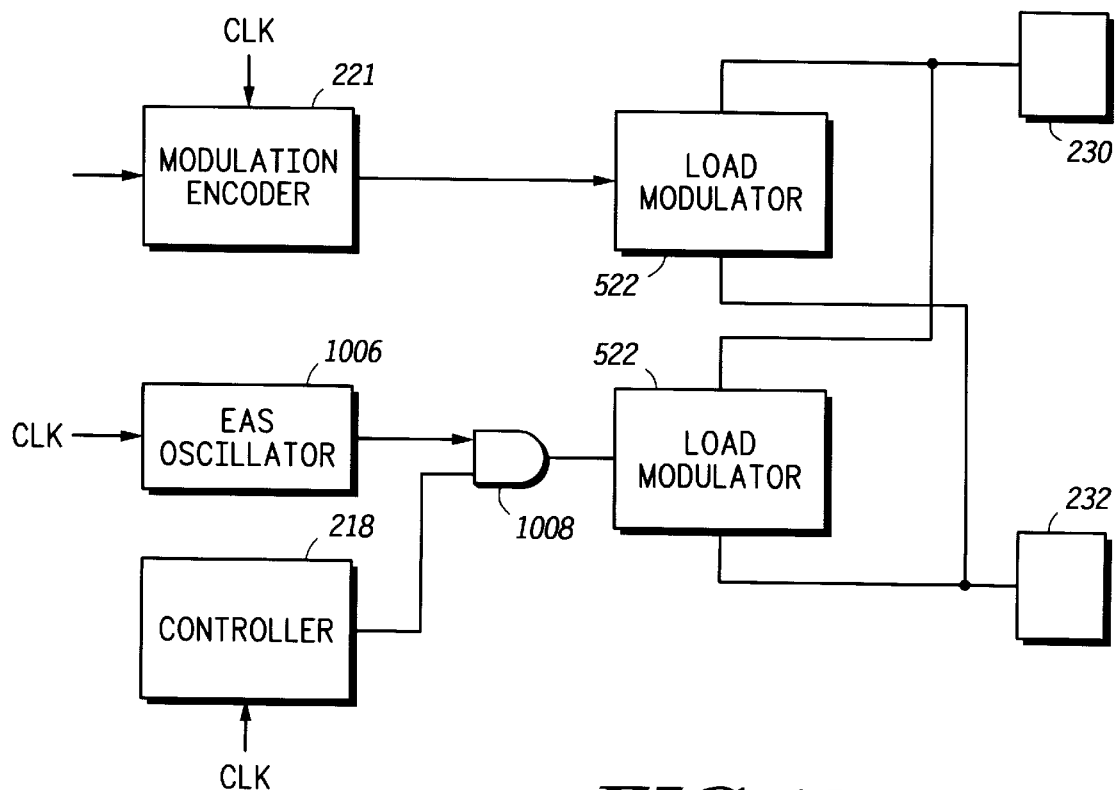
FIG. 19 is a schematic of an embodiment of a radio frequency identification tag circuit in accordance with a preferred embodiment of the present invention wherein the load modulation circuit includes a circuit for electronic article surveillance (EAS), which is selectively defeated.

FIG. 19 is a block diagram showing a radio frequency identification circuit including an EAS oscillator 1006 for generating a signal for electronic article surveillance. The circuit shown in FIG. 19 includes two load modulators 522, both capable of dampening signals on pads 230, 232. One load modulator receives the modulated signal from modulation encoder 221 in the manner described with respect to FIG. 3 above. The other load modulator 522 receives a signal from a gate 1008, which receives its input from EAS oscillator 1006 and controller 218. EAS oscillator 1006 is a bit rate generator that produces a data-rate signal. In a manner similar to that described above with respect to FIG. 18, gate 1008 is controlled by controller 218 to enable or disable an output from EAS oscillator 1006 from being load modulated onto pads 230, 232. This embodiment has the advantage of allowing an EAS signal to be modulated simultaneously with a normal read signal from a tag. Also, this embodiment allows the EAS signal to be defeated while still permitting the normal read tag signal lo be modulated on pads 230, 232.

Figure 20:
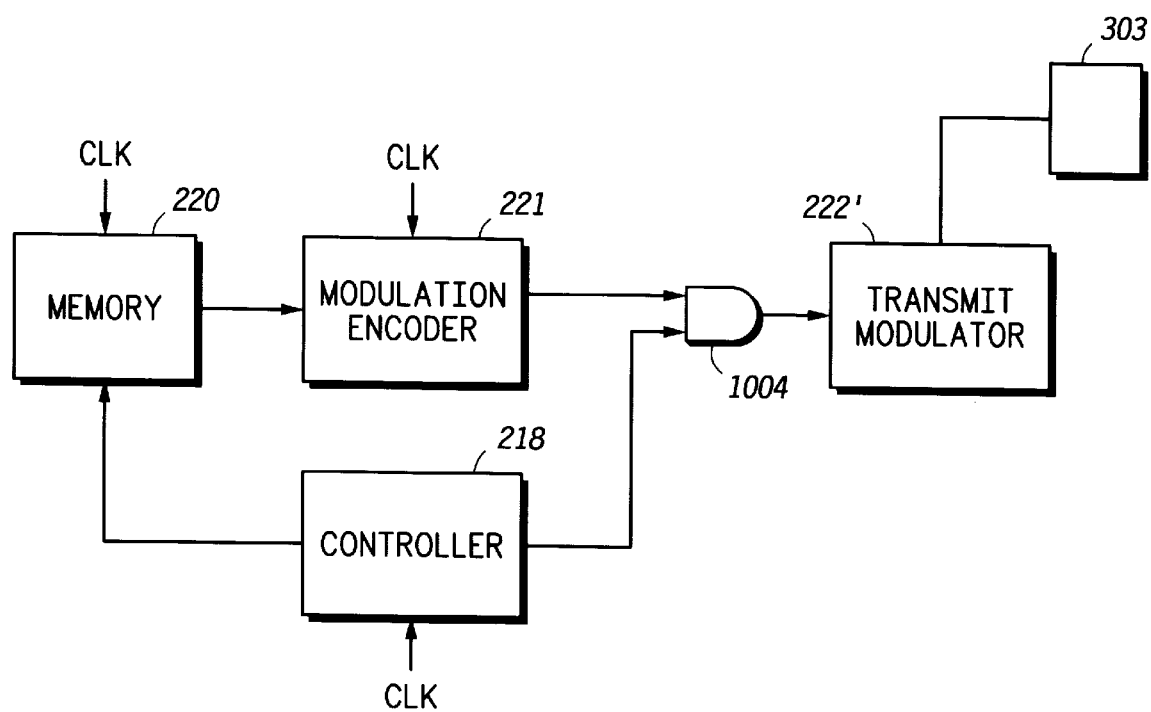
FIG. 20 is a schematic of a radio frequency identification tag circuit in accordance with an alternate preferred embodiment of the present invention wherein a transmit modulation circuit includes a circuit to selectively defeat modulation.

FIG. 20 shows a schematic diagram of another circuit that implements a feature to defeat or inhibit load modulation based on a circuit state. The circuit includes memory 220, modulation encoder 221, controller 218, transmit modulator 222', gate 1004, and pad 303. Memory 220 is coupled to controller 218 and modulation encoder 221 in the manner described above with respect to FIG. 4. The modulated signal output by modulation encoder 221 is received at one input of gate 1004. Controller 218 provides the other input to gate 1004. Gate 1004 is shown as an AND gate, although other logic gates and combinations of logic gates are configurable as gate 1004. The output of gate 1004 is the input signal I to transmit modulator 222'. In accordance with the present invention, the output of controller 218, that is, the input to gate 1004, is set at a logic low level to force the input signal I to stay at a logic low level regardless of the output from modulation encoder 221. Alternatively, if the output of controller 218 is placed in a logic high state, the output from modulation encoder 221 is reflected onto the input signal I by gate 1004. Hence, the output from the controller provides a feature whereby the transmit modulator 222' is enabled or disabled based on the output from the controller 218. Controller 218 retains a circuit state to determine the output used to enable or defeat the output from modulation encoder 221. In some applications, this feature is used to prevent modulation for a predetermined period of time so as not to interfere with electronic article surveillance systems. In some embodiments, this feature is used to delay the start of modulation for a specified period of time, for example, to allow the circuit to reach a stable power-up state.

The present invention provides an optimized method and circuit for electrostatic radio frequency identification tags. More specifically, a modulation circuit in accordance with the invention includes improved impedance and threshold voltage characteristics that improve efficiency and read ranges. Also charge pump stages are reduced or eliminated in accordance with the invention. This substantially reduces current consumption. These improvements advantageously allow better performance and better efficiency over prior electromagnetic radio frequency identification tags.

While the present invention optimizes, in particular, electrostatic radio frequency identification tags, the improved radio frequency identification circuit is still useful for electromagnetic radio frequency identification tags.

Whereas the present invention has been described with respect to specific embodiments thereof, it will be understood that various changes and modifications will be suggested to one skilled in the art and it is intended that the invention encompass such changes and modifications as fall within the scope of the appended claims.

What is claimed is:

1. A radio frequency identification tag comprising:
    a first antenna element;
    a second antenna element electrically isolated from the first antenna element; and
    a radio frequency identification circuit having a first pad and a second pad, said first and second pads being coupled, respectively, to said first and second antenna elements, said radio frequency identification circuit including a load modulation circuit coupled to at least one of said first and second pads that produces an amplitude modulated signal on said at least one of said first and second pads, wherein said amplitude modulated signal varies from a first amplitude to a second amplitude different from the first amplitude, said second amplitude being determined in part by a modulation impedance.

2. The tag of claim 1 wherein said load modulation circuit comprises a modulation switch and said modulation impedance is connected in series with said at least one of said first and second pads and said modulation switch, and said modulation switch is connected to a voltage reference.

3. The tag of claim 2 wherein said modulation impedance comprises a resistor.

4. The tag of claim 3 wherein said resistor is at least 100 ohms.

5. The tag of claim 3 wherein said resistor is 0.1 to 20 kilo ohms.

6. The tag of claim 2 wherein said modulation impedance comprises one of the following: a capacitor, a resistor connected to a capacitor, and a field-effect transistor.

7. The tag of claim 2 wherein said modulation switch comprises at least one of the following: a bipolar transistor, and a field-effect transistor.

8. The tag of claim 2 wherein said voltage reference is common.

9. The tag of claim 2 wherein said voltage reference comprises one of said first and second pads.

10. The tag of claim 2 wherein said modulation switch comprises a plurality of bipolar transistors connected in a Darlington configuration.

11. The tag of claim 1 further comprising a rectifier, coupled to the first and second antenna elements, to receive an electrostatically coupled signal from an excitation source, wherein the electrostatically coupled signal provides a power supply voltage to the radio frequency identification circuit.

12. The tag of claim 11 further comprising a clock extraction circuit, coupled to the first and second antenna elements, to extract a clock signal from the electrostatically coupled signal for use as a clock source for components on the radio frequency identification circuit.

13. A radio frequency identification tag comprising:
    a first antenna element;
    a second antenna element electrically isolated from the first antenna element;
    a radio frequency identification circuit having a first pad and a second pad, said first pad being coupled to said first antenna element and said second pad being coupled to said second antenna element; and
    wherein said radio frequency identification circuit includes a load modulation circuit coupled to said first pad and said second pad to selectively dampen a modulated signal on said first pad and another modulated signal on said second pad in response to an input signal received by said load modulation circuit.

14. The tag of claim 13 wherein said load modulation circuit comprises:
    a first modulation impedance and a first modulation switch connected in series with said first pad and a voltage reference; and
    a second modulation impedance and a second modulation switch connected in series with said second pad and the voltage reference.

15. The tag of claim 14 wherein said first and second modulation impedances each comprises a resistor.

16. The tag of claim 15 wherein each said resistor is at least 100 ohms.

17. The tag of claim 15 wherein each said resistor is 0.1 to 20 kilo ohms.

18. The tag of claim 14 wherein said first and second modulation impedances each comprise one of the following: a capacitor, a resistor connected to a capacitor, and a field-effect transistor.

19. The tag of claim 14 wherein said first and second modulation switches each comprises one of the following: a bipolar transistor, and a field-effect transistor.

20. The tag of claim 14 wherein said voltage reference is common.

21. The tag of claim 14 wherein said first and second modulation switches each comprises a plurality of bipolar transistors connected in a Darlington configuration.

22. A radio frequency identification tag comprising:
a first antenna element;
a second antenna element electrically isolated from the first antenna element; and
a radio frequency identification circuit having a first pad and a second pad, said first and second pads being coupled, respectively, to said first and second antenna elements, said radio frequency identification circuit including a load modulation circuit coupled to at least one of said first and second pads that produces a modulated signal that varies from a first amplitude to a second amplitude in response to a signal that must exceed a predetermined voltage threshold before said modulation circuit produces said modulated signal.

23. The tag of claim 22 wherein said predetermined threshold voltage is below one volt.

24. The tag of claim 22 wherein said load modulation circuit further comprises:
a first modulation impedance coupled to said first pad;
a first modulation switch coupled to said first modulation impedance; and
a first modulation threshold voltage circuit coupled to said first modulation switch and a first voltage reference.

25. The tag of claim 24 wherein said first modulation impedance comprises a resistor.

26. The tag of claim 25 wherein said first modulation switch comprises a transistor.

27. The tag of claim 25 wherein said first modulation threshold voltage circuit comprises a zener diode.

28. The tag of claim 25 wherein said first modulation threshold voltage circuit comprises a field-effect transistor with a gate and a drain connected to the first modulation switch and a source connected to the first voltage reference.

29. The tag of claim 24 wherein said load modulation circuit further comprises:
a second modulation impedance coupled to said second input pad;
a second modulation switch coupled to said second modulation impedance;
a second voltage threshold circuit coupled to said second modulation switch and a second voltage reference.

30. The tag of claim 29 wherein said second modulation impedance comprises a resistor.

31. The tag of claim 30 wherein said second modulation switch comprises a transistor.

32. The tag of claim 31 wherein said second modulation threshold voltage circuit comprises a zener diode.

33. The tag of claim 31 wherein said second modulation threshold voltage circuit comprises a field-effect transistor with a gate and a drain connected to the second modulation switch and a source connected to the second voltage reference.

34. The tag of claim 33 wherein the first voltage reference and the second voltage reference are the same.

35. The tag of claim 33 wherein the first voltage reference and the second voltage reference are common.

36. A radio frequency identification tag comprising:
a first antenna element;
a second antenna element electrically isolated from the first antenna element; and
a radio frequency identification circuit having a first pad and a second pad, said first and second pads being coupled, respectively, to said first and second antenna elements, said first pad and said second pad having a capacitance as measured between said first and second pads.

37. The tag of claim 36 wherein the input capacitance is less than 10 picofarads.

38. The tag of claim 36 wherein the first and second pads are on a die and the first pad is maximally spaced from the second pad.

39. The tag of claim 36 further comprising a rectifier, coupled to the first and second antenna elements, to receive an electrostatically coupled signal from an excitation source, wherein the electrostatically coupled signal provides a power supply voltage to radio frequency identification circuit.

40. The tag of claim 39 further comprising a clock extraction circuit, coupled to the first and second antenna elements, to extract a clock signal from the electrostatically coupled signal for use as a clock source for components on the radio frequency identification circuit.

41. A method of optimizing a radio frequency identification tag comprising the steps of:
A) providing a first antenna element;
B) providing a second antenna element that is electrically isolated from the first antenna element;
C) providing a radio frequency identification circuit having a first pad and a second pad, said radio frequency identification circuit including a load modulation circuit coupled to at least one of said first and second pads, said load modulation circuit producing an amplitude modulated signal that varies from a first amplitude to a second lower amplitude, said second lower amplitude being determined in part by a modulation impedance; and
D) coupling said first antenna element to said first pad and said second antenna element to said second pad.

42. The method of claim 41 wherein said modulation impedance is at least 100 ohms.

43. The method of claim 41 wherein said modulation impedance is in a range of 0.1 to 20 kilo ohms.

44. The method of claim 41 further comprising receiving an electrostatically coupled signal from an excitation source, wherein the electrostatically coupled signal provides a power supply voltage to the radio frequency identification circuit.

45. The method of claim 44 further comprising extracting a clock signal from the electrostatically coupled signal for use as a clock source for components on the radio frequency identification circuit.

46. A method of optimizing a radio frequency identification tag comprising the steps of:
A) providing a first antenna element;
B) providing a second antenna element that is electrically isolated from the first antenna element;
C) providing a radio frequency identification circuit having a first pad and a second pad, said radio frequency identification circuit including a load modulation circuit coupled to at least one of said first and second pads, said load modulation circuit producing an amplitude modulated signal that varies from a first amplitude to a second amplitude in response to an input signal that exceeds a predetermined threshold voltage before said modulation circuit produces a modulated signal; and D) coupling said first antenna element to said first pad and said second antenna element to said second pad.

47. The method of claim 46 wherein said predetermined threshold voltage is below one volt.

48. The method of claim 47 wherein said load modulation circuit has a modulation impedance that determines in part the second amplitude, and said modulation impedance is in a range of 0.1 to 20 kilo ohms.

49. The method of claim 46 wherein the threshold voltage is in the range of 0.8 to 1 volt.

50. A method of optimizing a radio frequency identification tag comprising the steps of:
providing a first antenna element;
providing a second antenna element that is electrically isolated from the first antenna element;
providing a radio frequency identification circuit including a first pad and a second pad; and
coupling said first antenna element to said first pad and said second antenna element to said second pad, wherein an input capacitance measured between the first pad and the second pad is less than 10 picofarads.

51. The method of claim 50 further comprising receiving an electrostatically coupled signal from an excitation source, wherein the electrostatically coupled signal provides a power supply voltage to the radio frequency identification circuit.

52. The method of claim 51 further comprising extracting a clock signal from the electrostatically coupled signal for use as a clock source for components on the radio frequency identification circuit.

53. A method of optimizing a radio frequency identification tag comprising the steps of:
providing a first antenna element;
providing a second antenna element that is electrically isolated from the first antenna element;
providing a radio frequency identification circuit including a first pad and a second pad; and
coupling said first antenna element to said first pad and said second antenna element to said second pad, wherein said first pad and said second pad are maximally spaced apart on a die.

54. A radio frequency identification tag comprising:
a first antenna element;
a second antenna element electrically isolated from the first antenna element;
a radio frequency identification circuit having a first pad and a second pad, said first and second pads being coupled, respectively, to said first and second antenna elements;
wherein said radio frequency identification circuit includes a memory that requires a high voltage for programming said memory, the high voltage being higher than a nominal supply voltage; and
wherein the high voltage is supplied by a charge pump, said charge pump including a plurality of stages of capacitors.

55. The tag of claim 54 wherein the charge pump has less than six stages.

56. A radio frequency identification tag comprising:
a first antenna element;
a second antenna element electrically isolated from the first antenna element;
a radio frequency identification circuit having a first pad and a second pad, said first and second pads being coupled, respectively, to said first and second antenna elements;
wherein said radio frequency identification circuit includes a memory that requires a high voltage for programming said memory, the high voltage being higher than a nominal supply voltage; and
wherein the high voltage is supplied by a circuit comprising:
a rectifier that rectifies an A.C. voltage from said antenna elements to produce a rectified voltage; and
a high voltage regulator that receives the rectified voltage and produces the high voltage for said memory.

57. The tag of claim 56 wherein said rectifier comprises one of the following: a full-wave rectifier, and a half-synchronized full wave rectifier.

58. The tag of claim 56 wherein said high voltage regulator comprises a zener diode.

59. The tag of claim 56 further comprising:
a logic voltage regulator that receives the rectified voltage and produces a regulated voltage for said radio frequency identification circuit.

60. A radio frequency identification tag comprising:
a first antenna element;
a second antenna element electrically isolated from the first antenna element;
a radio frequency identification circuit comprising:
a first pad coupled to the first antenna element;
a second pad coupled to the second antenna element;
a load modulation circuit coupled to at least one of said first pad and said second pad to dampen a signal on said at least one of said first pad and said second pad;
a gate with an output coupled to the load modulation circuit to provide an input signal to the load modulation circuit;
a controller having a circuit state that is reflected in a state output from the controller;
a modulation encoder that produces a modulated signal;
wherein the state output from the controller is a first input to the gate and the modulated signal from the modulation encoder is a second input to the gate; and
wherein the first input to the gate enables the second input to the gate to be reflected to the input signal of the load modulation circuit.

61. The tag of claim 60 wherein said circuit state changes at a predetermined time after the radio frequency identification circuit receives power.

62. The tag of claim 60 wherein the gate is an AND gate.

63. A radio frequency identification tag comprising:
a first antenna element;
a second antenna element electrically isolated from the first antenna element;
a radio frequency identification circuit comprising:
a first pad coupled to the first antenna element;
a second pad coupled to the second antenna element;
a first load modulation circuit coupled to at least one of said first pad and said second pad to dampen a signal on said at least one of said first pad and said second pad;
a second load modulation circuit coupled to at least one of said first pad and said second pad to dampen a signal on said at least one of said first pad and said second pad;
a gate with an output coupled to the first load modulation circuit to provide an input signal to the first load modulation circuit;
a controller having a circuit state that is reflected in a state output from the controller;

a modulation encoder that produces a modulated signal that is coupled as an input to the second load modulation circuit;

a bit-rate generator that produces a data-rate signal that is coupled to a first input of the gate;

wherein the state output from the controller is a second input to the gate; and wherein the second input to the gate enables the first input of the gate to be reflected to the output of the gate.

64. The tag of claim 63 wherein the gate is an AND gate.

65. The tag of claim 63 wherein said circuit state changes at a predetermined time after the radio frequency identification circuit receives power.

66. The tag of claim 63 wherein the data-rate signal is used for electronic article surveillance.

67. A radio frequency identification tag comprising:

a first antenna element;

a second antenna element electrically isolated from the first antenna element;

a third antenna element;

a radio frequency identification circuit comprising:

a first pad coupled to the first antenna element;

a second pad coupled to the second antenna element;

a third pad coupled to the third antenna element;

a rectifier coupled to the first antenna element and the second antenna element, wherein the rectifier rectifies an A.C. voltage from at least one of said first and second pads to produce a rectified voltage used to power the radio frequency identification circuit; and a transmit modulation circuit coupled to the third pad for transmitting a signal in response to receiving power.

68. The tag of claim 67 further comprising:

a gate with an output coupled to the transmit modulation circuit to provide an input signal to the transmit modulation circuit;

a controller having a circuit state that is reflected in a state output from the controller;

a modulation encoder that produces a modulated signal;

wherein the state output from the controller is a first input to the gate and the modulated signal from the modulation encoder is a second input to the gate; and wherein the first input to the gate enables the second input to the gate to be reflected to the input signal of the transmit modulation circuit.

69. The tag of claim 68 wherein said circuit state changes at a predetermined time after the radio frequency identification circuit receives power.

70. The tag of claim 69 wherein the gate is an AND gate.

* * * * *